(12) United States Patent
Kountouris (10) Patent No.: US 9,706,573 B2
(45) Date of Patent: Jul. 11, 2017

(54) METHOD OF ROUTING DATA IN A NETWORK OF SENSORS

(71) Applicant: Orange, Paris (FR)

(72) Inventor: Apostolos Kountouris, Grenoble (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/387,767

(22) PCT Filed: Mar. 27, 2013

(86) PCT No.: PCT/FR2013/050662
§ 371 (c)(1),
(2) Date: Sep. 24, 2014

(87) PCT Pub. No.: WO2013/144507
PCT Pub. Date: Oct. 3, 2013

(65) Prior Publication Data
US 2015/0055578 A1    Feb. 26, 2015

(30) Foreign Application Priority Data

Mar. 29, 2012  (FR) ..................... 12 52865

(51) Int. Cl.
*H04W 74/08*    (2009.01)
*H04W 84/18*    (2009.01)

(52) U.S. Cl.
CPC ........ *H04W 74/0808* (2013.01); *H04W 84/18* (2013.01)

(58) Field of Classification Search
None
See application file for complete search history.

(56) References Cited

U.S. PATENT DOCUMENTS

2006/0018336 A1    1/2006  Sutivong et al.
2008/0198815 A1*   8/2008  Liu ................... H04W 74/0816
                                                            370/336

(Continued)

FOREIGN PATENT DOCUMENTS

FR         2961986 A1     12/2011

OTHER PUBLICATIONS

Jamieson, et al, "Sift: A MAC Protocol for Event-Driven Wireless Sensor Networks", 2006, Springer-Verlang, pp. 260-275.*

(Continued)

*Primary Examiner* — Robert C Scheibel
(74) *Attorney, Agent, or Firm* — David D. Brush; Westman, Champlin & Koehler, P.A.

(57) ABSTRACT

A method is provided for routing data received during a first time window by a node-forming device of a network having a plurality of nodes suitable for communicating over a wireless communications channel. The method is adapted to select a time slot from a set of predefined time slots in a second time window consecutive with the first time window, to monitor the communications channel between the end of the first time window and the selected time slot in order to detect the presence or the absence of a signal on the channel, and to broadcast the data from an instant of the selected time slot in the event of detecting the absence of a signal and not to broadcast in the event of detecting the presence of a signal. Also provided is a node-forming device that performs the routing method.

9 Claims, 6 Drawing Sheets

(56) References Cited

U.S. PATENT DOCUMENTS

| | | | |
|---|---|---|---|
| 2010/0238862 A1* | 9/2010 | Davidson | G01S 5/0252 370/328 |
| 2011/0122849 A1* | 5/2011 | Jain | H04W 74/0808 370/336 |
| 2013/0100941 A1* | 4/2013 | Lampin | H04W 72/0446 370/336 |

OTHER PUBLICATIONS

Nguyen, et al, "A Prioritized MAC Protocol for Multihop, Event-driven Wireless Sensor Networks", 2006, IEEE, pp. 47-52.*

International Preliminary Report on Patentability and English translation of the Written Opinion dated Oct. 1, 2014 for corresponding International Application No. PCT/FR2013/050662, filed Mar. 27, 2013.

Kien Nguyen et al., "A Prioritized MAC Protocol for Multihop, Event-driven Wireless Sensor Networks", Communications and Electronics, 2006. ICCE '06. First International Conference on, IEEE, PI, Oct. 1, 2006, pp. 47-52, XP031079267.

International Search Report and Written Opinion dated Jun. 27, 2013 for corresponding International Application No. PCT/FR2013/050662, filed Mar. 27, 2013.

French Search Report and Written Opinion dated Sep. 26, 2012 for corresponding French Application No. 1252865, filed Mar. 29, 2012.

* cited by examiner

METHOD OF ROUTING DATA IN A NETWORK OF SENSORS

CROSS-REFERENCE TO RELATED APPLICATIONS

This Application is a Section 371 National Stage Application of International Application No. PCT/FR2013/050662, filed Mar. 27, 2013, the content of which is incorporated herein by reference in its entirety, and published as WO 2013/144507 on Oct. 3, 2013, not in English.

BACKGROUND OF THE DISCLOSURE

The invention relates to the field of wireless communications networks, and more particularly to multi-hop routing protocols used in wireless communications networks without infrastructure.

In known manner, a network without infrastructure, also known as an "ad hoc" network, is a network made up of nodes, e.g. sensors, that are connected node to node without any central control.

In a multi-hop routing protocol, a source node that cannot reach a destination node directly, e.g. because of distance or resource constraints, makes use of intermediate nodes for relaying the message. Thus, the source node broadcasts the message via a wireless link, e.g. a radio link. The message is received by at least one node within communication range of the source node, referred to as a neighboring node, which relays the message in turn to at least one of its neighbors, and so on until the final destination is reached. Nodes interact only with their direct neighbors. They do not know the overall topology of the network.

The protocol operates in two stages. In a first stage, routes are calculated. Then, in a second stage, data packets are conveyed over the calculated routes. The routes are periodically recalculated in order to take account of possible changes in the topology of the network.

The "greedy forwarding" routing protocol, as described for example in the document by Ivan Stojmenovic entitled "Position based routing in ad hoc networks", published in "IEEE Communications Magazine" is an example of a multi-hop routing protocol. In that routing protocol, routes are calculated by incremental construction. A metric calculated by a node on the basis of information provided by neighboring nodes enables the following node to be selected.

More precisely, the greedy forwarding routing protocol uses two types of information packets: HELLO and DATA. The HELLO packets are signaling messages. The DATA packets serve to convey data. Each node of the network knows its own geographical location and the location of the final destination. Each node exchanges its own location information with its direct neighbors by periodically sending HELLO packets. Thus, each node knows the locations of its neighbors. A node having data for transmission makes use of the location data received from its neighbors in order to select the neighboring node that is closest to the final destination and it transmits the data in one or more DATA packets to this selected node.

That protocol provides very good performance in particular in terms of delays, delivery rates, and power consumption.

Nevertheless, it is very sensitive to falsification of the information used for calculating the metric. For example, the HELLO packet transmitted by a malicious node might contain erroneous location information, e.g. close to the final destination. On the basis of such information, the malicious node is thus always selected from among the nodes neighboring a node seeking to determine a following node. Said node then always transmits to the malicious node those DATA packets that it needs to transmit, but the malicious node does not relay the DATA packets to the following node. It thus suffices for a single malicious neighbor to attract all of the traffic from a node in order to obtain total disconnection between a source node and the destination node.

There therefore exists a need for a routing protocol that is simple, that is robust against attempts at disturbing the operation of the network by piracy, and that consumes little energy.

SUMMARY

An aspect of the present disclosure relates to a method of routing data broadcast by a first device and received by a second device during a first time window, the first and second devices forming respective nodes of a network of a plurality of nodes suitable for communicating over a wireless communications channel, the method being characterized in that it comprises the following steps performed by the second node-forming device:

selecting one time slot from a set of predefined time slots of a second time window consecutive with said first time window;

monitoring said channel between the end of said first time window and said selected time slot in order to detect the presence or the absence of a signal on said channel;

broadcasting said data from an instant of said selected time slot in the event of detecting the absence of a signal; and not broadcasting in the event of detecting the presence of a signal.

Routing by broadcasting makes it possible to obtain routing that is robust against piracy.

The monitoring step serves to detect the presence of a signal on the radio link. The presence of a signal means that there is broadcasting activity by a node within communication range of the node under consideration.

A node detecting the presence of a signal deduces that the signal probably corresponds to data being broadcast by another node and does not broadcast the data.

In contrast, if it does not detect any activity, it does broadcast the data it has received.

Activating data transmission in a node consumes energy. Not broadcasting the data enables energy to be saved.

By means of this method, the amount of data that is transmitted by a node is reduced overall, thus making it possible to reduce the energy consumption of the node.

The use of a broadcast method and of a mechanism that enables the number of messages that are transmitted to be reduced serves to provide a method that is economical in energy terms while being simple, reliable, and robust.

According to a characteristic of the routing method, the time slot is selected by randomly drawing a value identifying said slot, the random draw being performed in application of a defined probability distribution.

The random draw serves to make the moment of data transmission unpredictable and thus to obtain a method that is robust against piracy.

In a particular implementation of the routing method, the second time window comprises a predetermined number N of predetermined consecutive time slots, a rank is associated with a slot as a function of the position of said slot relative to the beginning of the second time window, and the probability of selecting the slot of rank k+1 from among the N slots is greater than or equal to the probability of selecting the slot of rank k.

Such a probability distribution favors selecting slots of high rank, i.e. slots that are remote from the instant at which data is received. With such selection, the monitoring step is longer than when selecting a slot of low rank. The probability of detecting activity is increased. The probability of needing to broadcast data is thus decreased. This provides additional energy savings.

In another implementation of the routing method, that may be used on its own or in combination with the above implementation, the probability of selecting a slot identifier value is determined as a function of a value representative of received signal quality while receiving said data.

A probability distribution determined as a function of signal quality serves to weight the probability of selecting a slot as a function of the quality of the received signal. The quality of the received signal is better when the distance between a transmitter and a receiver node is short than when said distance is long. This property is used herein to weight the probability of selecting different slots. For example, the weighting serves to favor selecting a time slot close to the instant of data reception and thus to favor broadcasting the data by the node, or on the contrary to favor selecting a time slot that is remote from the instant of reception and thus to decrease the probability of the node broadcasting data.

In a particular characteristic of the routing method, said value representative of signal quality is determined on the basis of a measurement of said signal.

A signal measurement representative of the quality of the received signal is performed on the received signal while receiving data. The measurement of the signal serves to determine a value representative of the quality specific to each node and to the reception of each message. The value representative of the received signal is determined by each node. Different values are calculated by two nodes receiving the same data at the same time. Likewise, different values are calculated by a single node receiving the same data at different times.

In a particular implementation of the routing method, the probability of selecting a value identifying a slot is determined as a function of a value representative of received signal quality during reception of said data, of the number of slots, and of said value identifying the slot and the probability of selecting a slot of low rank is inversely proportional to said value representative of received signal quality.

Poor received signal quality indicates a long distance between the transmitter node and the receiver node. Weighting that increases the probability of selecting a low rank slot increases the chances of the node not receiving a signal during the monitoring stage and thus increases the chances of it broadcasting the data. The data is then transmitted by fewer intermediate nodes and progresses quickly to its destination.

In an implementation of the routing method, the broadcasting step is followed by an idle step during which the receive function is deactivated.

The broadcast data transmitted by a first node is received by a neighboring node, which is a second node. This second node rebroadcasts the message. During this rebroadcast by the second node, since the first node is in communication range of the second node, it is likely to receive the rebroadcast data. The idle state after a broadcast step avoids this first node receiving the rebroadcast data. Since receiving data by a node consumes more energy than being idle, adopting the idle state provides additional energy savings.

In another implementation that may be used on its own or in combination with an above-described implementation, the non-broadcasting step includes a listening step during which the receive function is activated.

The listening step enables a node that has not broadcast the data to ensure that the data has been broadcast by a neighboring node.

In an implementation, that may be used on its own or in combination with an above-described implementation, the non-broadcasting step is followed by a step of selecting the slot of smallest rank and a step of broadcasting data.

Selecting a slot of low rank during the process enables the node to be the first to reserve access to the medium and thus to broadcast the data, regardless of the slots selected by the other nodes. This process is particularly useful when a malicious entity always transmits a signal during the low rank slot for the purpose of preventing other nodes from transmitting, and thus for the purpose of blocking the system. This process enables the method to resist piracy better.

According to a particular characteristic, in the event of detecting a signal during the monitoring step, the routing method includes a reception step of receiving data and a comparison step of comparing the data received during the first time window with the data received during the reception step.

In this implementation, after detecting activity, the node switches to reception in order to be sure that the data it receives corresponds to the data it received beforehand. It thus verifies that the data it has received has been retransmitted. If this is not so, for example if the data is different or erroneous, it may envisage transmitting the initially received data. This implementation serves to increase the reliability with which data is transmitted.

In an implementation of the routing method, the broadcasting step is followed by a reception step of receiving data, a comparison step of comparing said received data with the data transmitted during the broadcasting step, and as a function of the result of the comparison, an idle step during which the receive function is deactivated, or a step of rebroadcasting said transmitted data.

The reception and comparison steps make it possible to ensure that the data has been retransmitted. They are used as an acknowledgment of the data transmission. Non-reception of data or reception of data that does not correspond to the data that was transmitted are interpreted as an error in transmission and the data is retransmitted once more. This implementation serves to increase the reliability with which data is transmitted.

In a variant, it is possible to define a maximum number of attempts at retransmission in order to ensure that the process comes to an end.

The invention also provides a device forming a node of a network having a plurality of nodes suitable for communicating via a wireless communications channel, the device having receive means for receiving a data message during a first time window, said data being broadcast by a first node-forming device.

According to the invention, the device comprises:
  selector means for selecting a time slot from a set of predefined time slots of a second time window consecutive with said first window;
  monitor means for monitoring said channel between the end of said first time window and said selected time slot in order to detect the presence or the absence of a signal on said link;

broadcast means for broadcasting said data from an instant of said time slot in the event of detecting the absence of a signal; and means for not broadcasting in the event of detecting the presence of a signal.

The invention also relates to a sensor suitable for collecting data and for retransmitting the data towards a collector device, the sensor being characterized in that it comprises a node-forming device as described above.

The invention also provides a system comprising a plurality of node-forming devices, including at least one node-forming device as described above.

Finally, the invention provides a computer program product including instructions for performing the steps of a routing method as described above when loaded in and executed by a processor.

BRIEF DESCRIPTION OF THE DRAWINGS

Other features and advantages of the present invention appear in the following description of implementations given as non-limiting examples with reference to the accompanying drawings, in which.

DETAILED DESCRIPTION OF ILLUSTRATIVE EMBODIMENTS

The invention is performed by means of software and/or hardware components. In this context and in this document, the term "module" may correspond equally well to a software component or to a hardware component or to a set of hardware and/or software components suitable for performing a function or a set of functions, as described below for the module in question.

A software component comprises one or more computer programs, one or more subprograms of a program, or more generally any element of a program or of software. Such a software component is stored in memory and then loaded and executed by a data processor of a physical entity (a terminal, a server, a gateway, a set-top box, a router, etc.) and it is capable of accessing the hardware resources of this physical entity (memory, data media, communications bus, electronic input/output cards, user interfaces, etc.).

In the same way, a hardware component corresponds to any element of a hardware assembly. It may be a programmable hardware component or it may incorporate a processor for executing software, e.g. an integrated circuit, a smart card, an electronic card for executing firmware, etc.

A first implementation of the invention is described below with reference to FIGS. 1 to 5.

Figure 1:
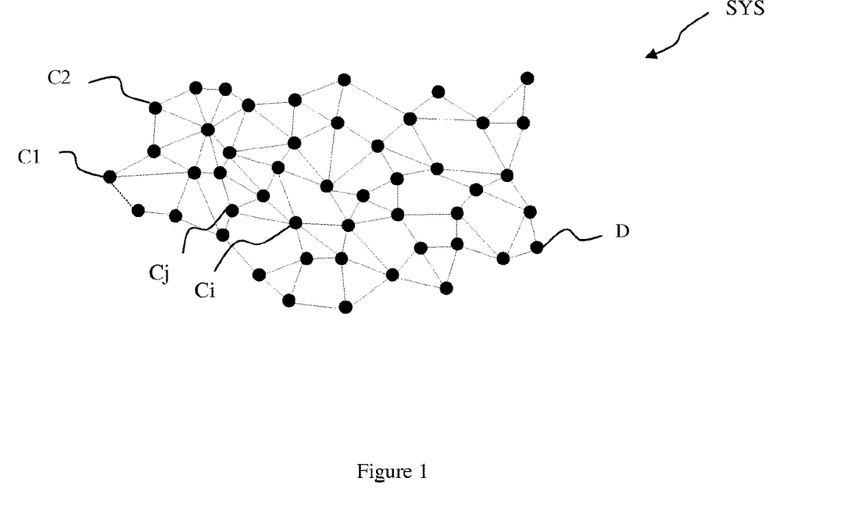
FIG. 1 is a general diagram showing the general context of the invention.

FIG. 1 shows a system SYS comprising a collector device D and a plurality of sensors C1, C2, . . . , Ci, . . . placed randomly in a uniform distribution over a geographical zone.

By way of example, each sensor Ci is a measurement sensor suitable for periodically performing a set of measurements and for transmitting data containing the measurements taken to the collector device D.

Each sensor Ci is also suitable for receiving data from another sensor of the system SYS and for relaying that data to the collector device D.

Each sensor Ci represents a respective node.

The plurality of nodes is organized in a network that is said to have no infrastructure, or that is referred to as an "ad hoc" network.

In the description below, a sensor may be referred to equally well as a node or as a sensor.

A sensor represents a device forming a node.

Each node is suitable for communicating with the nodes neighboring that node via a wireless link, e.g. a Zigbee, WiFi, or other radio type link.

A node neighboring a current node is a node in communication range of the current node. More precisely, the Euclidean distance between a current node and a node neighboring the current node is then the communications range. It is specified that the communications range may vary depending on propagation conditions.

The link between two nodes is a bidirectional link.

In known manner, the transmit power limit for wireless links does not enable a current node to dialog over a direct link with all of the nodes of the system SYS.

Thus, data is transmitted from a current node to the collector device D that is out of range of the current node via one or more intermediate nodes. More generally, the transmission of data from a source node towards the collector device D takes place using a multiple-hop routing protocol.

By way of example, after taking a set of measurements, a sensor of the system SYS, e.g. the sensor C1, seeks to transmit data MD including the measurements taken to the collector device D. Since the collector device D is not in communication range of the sensor C1, the sensor C1 cannot transmit the data directly to the collector device D. The data MD is transmitted node by node via sensors of the system SYS until it reaches the collector device D.

More precisely, the sensor C1 broadcasts a message M containing the data MD. The message M is received by the neighboring nodes, i.e. the nodes within communication range of the node C1. Thereafter, at least one of the neighboring nodes broadcasts the message M it has received. The process is reiterated until the message M reaches the collector device D.

Figure 2:
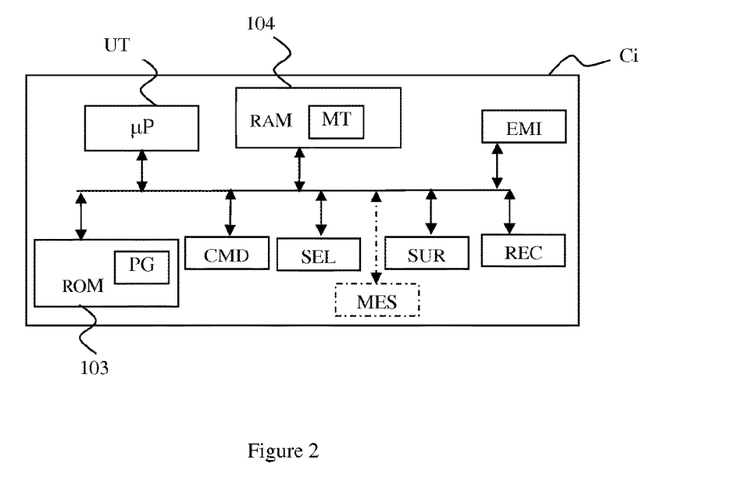
FIG. 2 is a block diagram showing a sensor suitable for performing the steps of a routing method in an implementation of the invention.

FIG. 2 shows an example of a sensor Ci of the system SYS.

In conventional manner, the sensor Ci comprises in particular a processor unit UT having a microprocessor, a read only memory (ROM) or an electrically erasable programmable read only memory (EEPROM) 103, a random access memory (RAM) 104, a transmit module EMI, and a receive module REC.

The transmit module EMI is suitable for transmitting data via a wireless link. More precisely, the transmit module EMI is suitable for transmitting a signal representative of data over a communications channel Z of predetermined frequency.

The receive module REC is suitable for receiving data via a wireless link. More precisely, the receive module REC is suitable for receiving a signal representative of data transmitted over the communications channel Z of predetermined frequency by a node within communication range.

The ROM 103 has registers storing a computer program PG.

The processor unit UT is controlled by the computer program PG in particular for the purpose of performing the routing method in one of the implementations of the invention as described below.

The sensor Ci also has a selector module SEL for selecting a time slot, a monitor module SUR, a control module CMD, and a temporary memory MT.

By way of example, the memory MT is memory of the RAM type and suitable for storing data, e.g. a measurement report as received from a neighboring node.

The sensor Ci may also include a measurement module MES suitable for periodically taking a set of measurements and for storing the results of the measurements in the temporary memory MT.

The receive module REC is suitable for receiving a message containing data and for storing the received data in the temporary memory MT.

In known manner, the sensor Ci operates in one of the following three modes: a broadcast mode in which the transmit module EMI can transmit data over the communications channel; a listening mode in which the receive module REC can receive data over the communications channel; and an idle mode in which the sensor can neither transmit data nor receive data.

Figure 3:
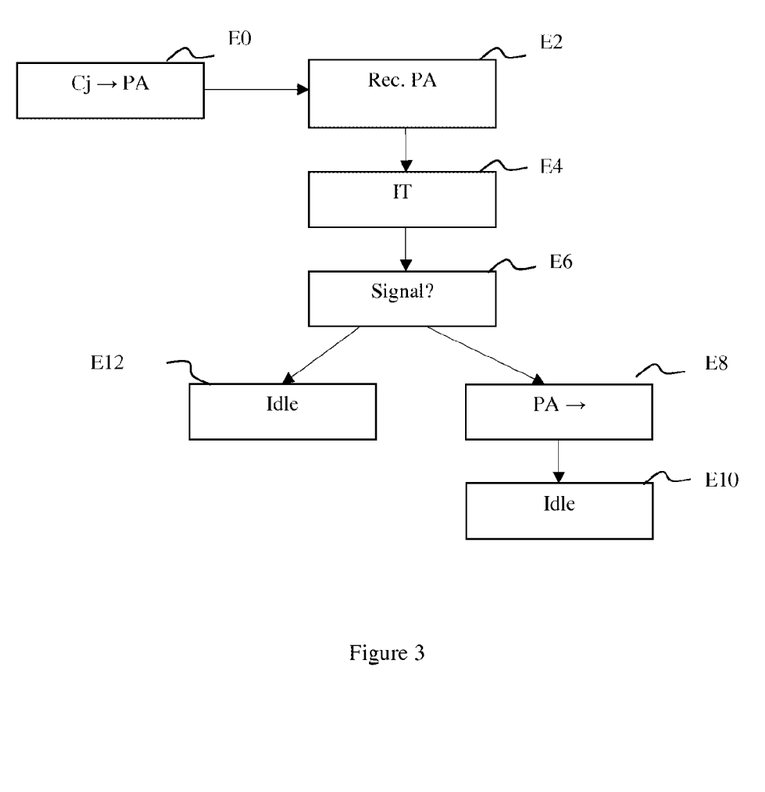
FIG. 3 is a flow chart showing the various steps of a routing method in a first implementation.

The method of the invention that is performed by a sensor Ci of the system SYS is described below with reference to FIG. 3.

In a first step E0, a sensor Cj broadcasts a data packet PA containing data MD over the communications channel Z.

Figure 4:
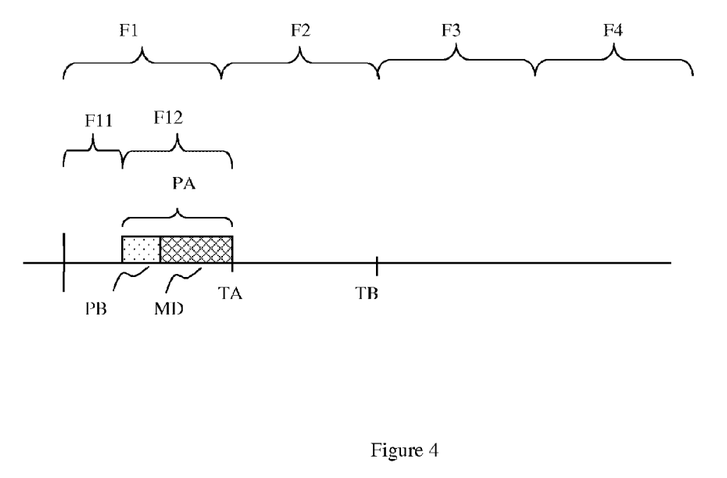
FIG. 4 is a diagram showing time windows.

The packet PA is sent by the sensor Cj during a first time window F1. More precisely, the first time window F1 comprises a first contention time window F11 followed by a first data transmission time window F12.

FIG. 4 is a diagram showing the time windows.

For a duration beginning at a time instant T situated in the first contention time window F11 and terminating at the end of the first contention time window, the sensor Cj transmits a channel reservation signal. This reservation signal is a control signal suitable for reserving access to the medium.

The channel reservation signal may for example be a signal obtained by modulation of a predetermined symbol sequence.

Thereafter, during the first data transmission time window F12, the sensor Cj transmits the data packet PA over the communications channel Z. The data packet PA comprises a preamble PB followed by data MD. The preamble PB contains data enabling the packet PA to be identified, such as, for example, an identifier of the source node, i.e. of the first node of the network that transmitted the data MD. The preamble PB may also contain identifiers of one or more intermediate nodes, i.e. nodes that have received the data MD and that have relayed it.

The packet PA containing the data MD is received by the receive module REC of the sensor Ci during a step E2. In order to simplify the description, the times required for transferring data packets are assumed herein to be negligible, and it is assumed that the packet PA is received as soon as it is transmitted, i.e. that the packet PA is received during the first time window F1, or more precisely during the data transmission time window F12. In other words, the steps E0 and E2 are performed simultaneously.

The end of the reception of the packet PA by the node Ci takes place at a time instant TA corresponding to the end of the time window F1.

During a step E4, the selector module SEL of the sensor Ci selects a time slot IT from a set of predefined time slots in a second time window F2.

Figure 5:
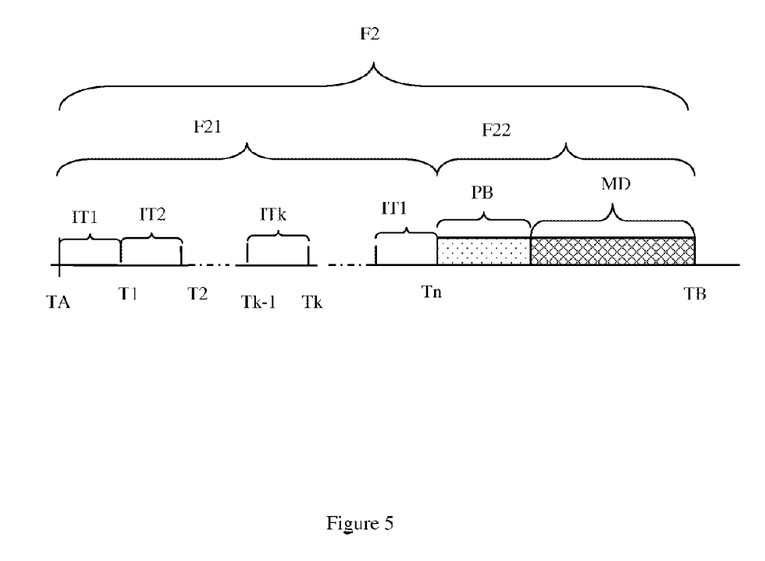
FIG. 5 is a diagram showing one time window.

FIG. 5 shows the second time window F2.

The second time window F2 is a time window of duration equal to the duration of the first time window F1. The second time window F2 begins at the instant TA at which the first time window F1 ends, i.e. at the end of receiving the packet PA.

The second time window F2 comprises a second contention time window F21 followed by a second data transmission time window F22, each of which is of predetermined duration.

The second contention time window F21 is subdivided into a predetermined number N of time slots IT1, IT2, ..., ITn.

In the implementation described, the time slots are all of the same duration. They are consecutive, and the end of one slot corresponds to the beginning of the following slot. The time slots are thus ordered. Each slot has a rank allocated thereto as a function of its position relative to the start instant TA of the second time window F2, the slot IT1 of rank 1 being the slot that begins at the instant TA, and the slot ITn of rank N being the slot that ends at the end of the second contention time window F21.

The slot ITk of rank $\underline{k}$ thus begins at the end of the slot IT(k−1), of rank (k−1).

As an alternative, the time slots could be disjoint.

The slot ITk of rank $\underline{k}$ begins at an instant $T_{k-1}$ and ends at an instant Tk.

During the step E4, the selector module SEL of the sensor Ci selects a time slot IT from among the N time slots.

The time slot IT is selected by randomly drawing a value that identifies the slot, where the random draw complies with a defined probability distribution.

The value identifying a slot may for example be the rank associated with the slot.

By way of example, the random draw may be performed on a set of values identifying a slot, e.g. the N ranks.

The probability distribution P1 is an increasing distribution, i.e. the probability P1(k+1) of selecting the rank (k+1) is greater than or equal to the probability P1(k) of selecting the rank $\underline{k}$.

Consequently, the probability of selecting a time slot of rank (k+1) is greater than or equal to the probability of selecting a time slot of rank $\underline{k}$.

Furthermore, the probability distribution P1 is such that the sum of the probabilities of selecting each of the slots IT is equal to 1:

$$P1(1)+P1(2)+ \ldots +P1(N)=1$$

By way of example, the probability distribution P1 is a uniform distribution whereby the probability of selecting each time slot is 1/N.

The selected time slot IT may for example be the slot ITk of rank $\underline{k}$ beginning at the instant $T_{k-1}$ and terminating at the instant Tk.

During a step E6, performed between the instant TA at the start of the second time window F2 and the instant $T_{k-1}$ at the start of the selected slot ITk, the monitor module SUR of the sensor Ci monitors the communications channel Z in order to detect transmission activity thereon by a neighboring node. More precisely, the monitor module SUR monitors whether a signal is being received by the receive module REC of the sensor Ci. When a neighboring node attempts to access the medium, it transmits a signal as described above. That signal is then received by the receive module REC of the sensor Ci. The receive module REC receiving a signal during at least a portion of a period lying between TA and $T_{k-1}$ indicates that there is transmission activity being performed by at least one of the nodes neighboring the sensor Ci.

If no signal is detected during the monitoring step E6, then the control module CMD of the sensor Ci acts during a step E8 to cause the transmit module EMI of the sensor Ci to broadcast the data MD received during the first time window F1. More precisely, between the instants $T_{k-1}$ and Tn, the transmit module EMI of the sensor Ci sends a signal to reserve access to the medium, and then between the instant Tn and an instant TB at the end of the second time window F2, the transmit module EMI of the sensor Ci transmits the data MD. More precisely, the transmit module EMI of the sensor Ci transmits the data packet PA containing the preamble PB followed by the data MD.

As an alternative, the packet that is transmitted is a packet PA1 containing a preamble PR and the data MD. The preamble PR corresponds to the preamble PB received during the step E2, with modifications. By way of example, the modified preamble PR corresponds to the preamble PB to which the details of the sensor Ci have been added.

The step E8 is followed by a step E10 during which the control module CMD of the sensor Ci puts the sensor Ci into an idle mode for a predetermined duration, e.g. one or several time windows.

If a signal is received during the monitoring step E6, then the control module CMD of the sensor Ci interprets this presence of a signal as constituting the broadcasting of the packet PA by a neighboring node that has received the same packet PA, and the control module CMD of the sensor Ci does not cause the packet PA containing the data MD to be broadcast (step E12). The packet PA is not broadcast by the sensor Ci. The step E12 is a no broadcast step.

In the implementation described, during the no broadcast step E12, the sensor Ci is put into idle mode and it remains in this mode for a predetermined duration, e.g. one or several time windows. The idle mode is a mode in which the sensor is both deaf and dumb, i.e. it does not send any signal and it takes no account of signals broadcast by neighboring nodes.

In a first variant, the no broadcast step E12 is a listening step during which the control module CMD of the sensor Ci does not cause the sensor Ci to switch to idle mode, so it remains in reception mode during the second time window F2.

If no data packet is received by the receive module REC of the sensor Ci during the second time window F2, then steps E4 to E12 are reiterated during a third time window F3 (FIG. 4). The time window F3 is of duration equal to the duration of the second time window F2 and it begins at the end of the time window F2.

If a packet PA1 is received during the second time window F2, the control module CMD of the sensor Ci compares the packet PA1 received during the second time window F2 with the packet PA received during the first time window F1. The control module CMD executes an idle step or a re-broadcast step as a function of the result of the comparison.

If during the comparison it is determined that the packet PA and the packet PA1 are identical, then the control module CMD of the sensor Ci puts the sensor Ci into idle mode. Receiving a packet PA1 identical to the packet PA means that one of the neighbors that received the packet PA during the first time window F1 has broadcast it during the second time window F2.

In a particular implementation, the comparison between the two data packets consists in comparing some or all of the information contained in the preambles of the packets, e.g. the identifiers of the source node.

Receiving a packet PA1 identical to the packet PA during the second time window F2 acts as an acknowledgment of the transmission.

If during the comparison it is determined that the data packets PA1 and PA are different, then steps E4 to E12 are reiterated during a third time window F3 beginning at the end of the second time window F2 and of length identical to the respective lengths of the first and second time windows F1 and F2.

The retransmission process, i.e. reiterating steps E4 to E12 during a time window following a current time window in the event that no packet is received during the current time window or that the packet received during the current time window does not correspond to the expected packet, may be executed several times over.

In a variant implementation, a maximum number of reiterations is set and the retransmission process is stopped when the maximum number is reached.

In another variant implementation, when the maximum number of reiterations is reached, the listening step is followed by a step of selecting the time slot having the lowest rank, e.g. the rank 1, and then the monitoring step E6, the broadcast step E8, and the idle step E10 are reiterated. Selecting rank 1, i.e. selecting the time slot IT1, implies that the step E8 of broadcasting the data will be executed. When it is the slot IT1 that is selected, no signal is received during the monitoring step E6.

In a second variant that may be used on its own or in addition to the first variant, the step E8 of broadcasting the packet PA during the second time window F2 is followed by a listening step during which the control module CMD of the sensor Ci puts the sensor Ci into listening mode during the third time window F3 following the second time window F2.

If no packet is received during the third time window F3 by the receive module REC of the sensor Ci, then steps E4 to E10 are reiterated during a fourth time window F4 beginning at the end of the time window F3 (FIG. 4).

If a data packet PA2 is received during the third time window F3, the control module CMD of the sensor Ci compares the packet PA2 received during the third time window F3 with the packet PA transmitted during the second time window F2.

If the packets PA and PA2 are identical, the control module CMD of the sensor Ci puts the sensor Ci into idle mode during one or several time windows. Receiving a packet PA2 identical to the packet PA means that one of the neighbors of the sensor Ci received the packet PA during the time window F2 and rebroadcasted it during the third time window F3.

Receiving a packet PA2 during the third time window F3 that is identical to the packet PA serves as an acknowledgment of the transmission.

If the data packets PA and PA2 are different, the steps E4 to E12 are reiterated by the sensor Ci during a fourth time window F4 beginning at the end of the third time window F3 and of length identical to the respective lengths of the first and second time windows F1 and F2.

In a variant of the implementation, a maximum number of attempts at retransmission may be defined so as to ensure that the process comes to an end.

In another variant that may be used on its own or in combination, after a predefined maximum number of unsuccessful attempts at transmission, the lowest rank slot is selected. Selecting the lowest rank slot means that the data will be broadcast.

Figure 6:
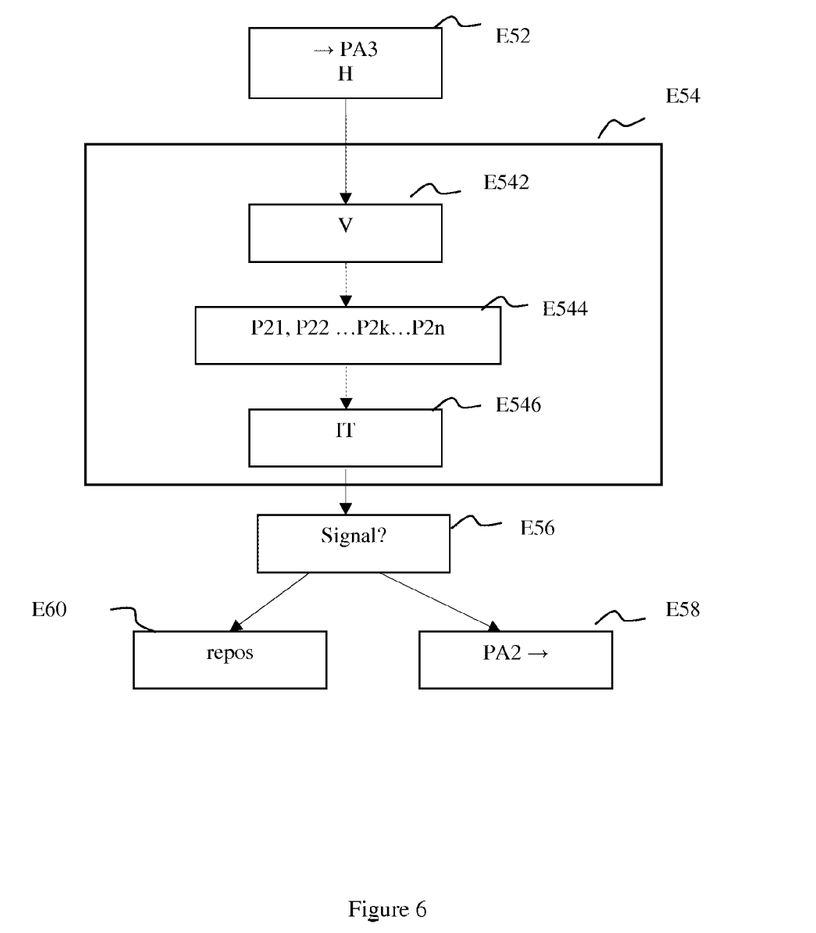
FIG. 6 is a flow chart showing the various steps of a routing method in a second implementation.

A second implementation of the routing method performed by the sensor Ci of the system SYS is described below with reference to FIG. 6.

During a step E52, the sensor Ci receives a data packet PA3 containing data MD2. By way of example, the packet PA3 has been broadcast by a sensor Cj neighboring the sensor Ci.

The packet PA3 is received during a first time window F1.

More precisely, the first time window F1 comprises a first contention time window F11 followed by a first data transmission time window F12.

For a duration beginning at a time instant T lying in the first contention time window F11 and terminating at the end of the first contention time window, the sensor Ci receives a signal transmitted over the communications channel Z to indicate that a data packet is to be broadcast. Then during the first transmission window F12, the sensor Ci receives a data packet containing a preamble and data MD2.

Likewise, during the step E52, while receiving the preamble, the sensor Ci takes a measurement H of the received signal strength indication (RSSI). RSSI is defined in particular in the 802.11 standard of the Institute of Electrical and Electronic Engineers (IEEE) and is a measurement of the power of the received radio signal.

In known manner, the power of the received signal varies as a function of the distance between the transmitter node and the node receiving the data. The greater the distance, the lower the power of the received signal.

As an alternative, the measurement H may be a received channel power indicator (RCPI) measurement, or indeed a measure of the intensity of the received signal.

More generally, the measurement H is a measurement of the signal received by the sensor Ci while receiving a data packet.

As an alternative, the measurement H is performed throughout the duration of receiving the data packet.

More generally, the measurement H is a measurement suitable for evaluating a "distance" in the broad sense between the transmitter node that transmitted the signal and the receiving sensor Ci that is receiving the signal.

During a step E54, the selector module SEL of the sensor Ci selects a time slot IT from a set of N predefined time slots of a second time window F2.

The second time window F2 is a time window of duration equal to the duration of the first time window F1 and it begins at the instant TA at the end of the first time window F1, i.e. at the end of receiving the received packet PA2.

The second time window F2 comprises a second contention time window F21 followed by a second data transmission time window F22, each of predetermined duration.

The second contention time window F21 is subdivided into a predetermined number N of time slots IT1, IT2, . . . , ITn.

In the presently-described implementation, the time slots are consecutive and the end of one slot corresponds to the beginning of the following slot. The time slots are thus ordered. Each time slot is given a rank as a function of its position relative to the instant T0 at the beginning of the second time window F2, the slot IT1 of rank 1 being the slot beginning at the instant T0, and the slot ITn of rank N ending at the end of the second time window F2.

The slot of rank (k+1) thus begins at the end of the slot of rank $\underline{k}$.

The time slot IT is selected by randomly drawing a value identifying the slot, the random draw complying with a probability distribution P2.

The probability distribution P2 is an increasing probability distribution and is such that the sum of the probabilities for each of the slots IT is equal to 1.

More precisely, step E54 comprises three substeps E542, E544, and E546.

During the first substep E542, a value A representative of the quality of the received signal is determined on the basis of the measurement H determined during the step E52.

The value A is determined by applying a predetermined function to the measurement H. More precisely, the value A representative of the quality of signal is determined by the following formula:

$$A = G(H)$$

where G represents a predetermined decreasing function.

Figure 7:
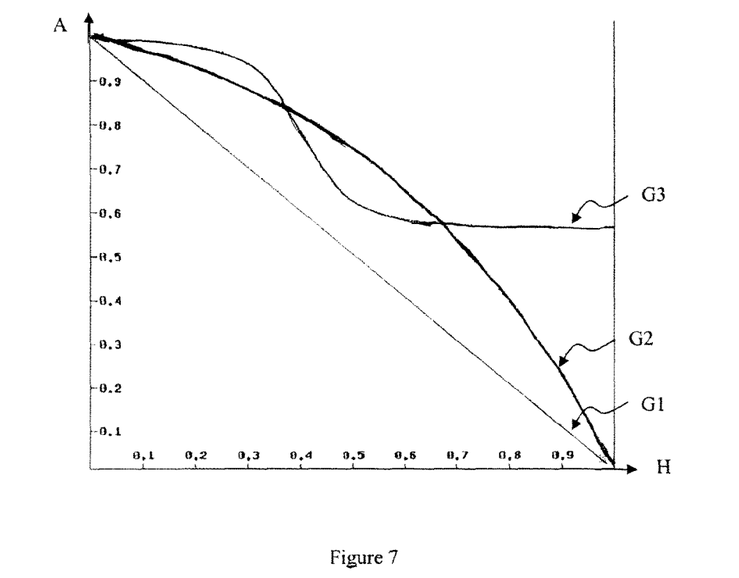
FIG. 7 shows examples of functions used for determining a value that is representative of signal quality.

FIG. 7 shows examples of the function G.

By way of example, the function G may be a linear function G1, an exponential function G2, or a sigmoid function G3.

In the examples shown in FIG. 7, the values both of H and of A lie in the range [0,1].

As an alternative, any range may be defined for A and for H.

By way of example, the value A may be determined by the following expression:

$$A = G(H) = (1-8^{(H-1)})/(1-8^{-1})$$

where the measurement H is expressed in the form of a predetermined number of bits, e.g. 8 bits. In this context, the value A is a number lying in the range 0 to 1.

In known manner, the power of the received signal varies as a function of the distance between the transmitter node and the node receiving the data. The greater this distance, the weaker the power and the closer the value A comes to 0.

The value A is thus determined as a function of a measurement of the received signal. This measurement depends on the neighborhood context of a node, and in particular on the distance between the transmitter node and the node receiving the data. The value A is thus different for each node and different on each occasion data is received. Thus, each node individually adjusts its distribution as a function of its local neighborhood context.

Then, during a step E544, the probability P2k of selecting each time slot ITk is determined.

The probability P2k of selecting a time slot ITk is a function F of the value A representative of the quality of the received signal and of the number N of time slots in the contention window.

For example, $$P2k = F(A,N,k) = A^{-k}(1-A)A^N/(1-A^N)$$

The value A represents a parameter for controlling the rate of growth of the probability distribution P2.

N probabilities P21, P22, . . . , P2n are thus determined, for each of the slots IT1, IT2, . . . , ITn, respectively.

Figure 8:
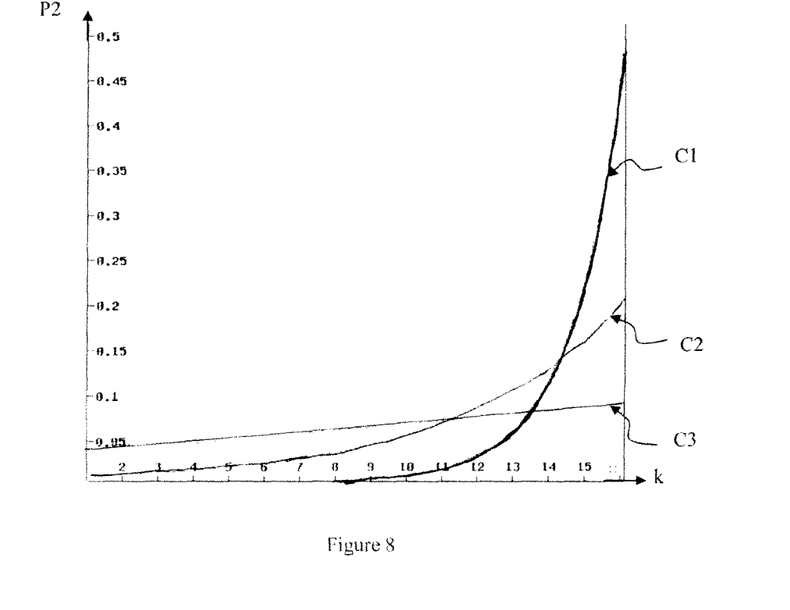
FIG. 8 shows examples of curves illustrating probability values obtained for each slot over a set of 16 slots, as a function of the rank $k$ of the slot and of a value representative of signal quality.

FIG. 8 shows examples of curves illustrating the probability values P2k obtained for each slot in a set of 16 slots, as a function of the rank $\underline{k}$ of the slot and of a value for A.

The curve C1 corresponds to a value of A=A1=0.95.
The curve C2 corresponds to a value of A=A2=0.8.
The curve C3 corresponds to a value of A=A3=0.5.

The value of P2$k$ obtained for a time slot of low rank is greater with A3 than with A2 and A1.

The function P2 as defined above makes it possible to obtain a probability of selecting a low rank time slot that is higher when the power is low than when the power is high.

This weighting of the probability distribution P2 as a function of the power of the received signal makes it possible to increase the probability of a remote node transmitting the message.

Thereafter, during a step E546, the sensor Ci selects a value identifying a time slot IT from among the N time slots by a random draw in application with the probability distribution P2. The slot IT identified by this value is the slot that is selected.

As an alternative, the various possible values of P2$k$ for various values of A, of N, and of $\underline{k}$ are determined during a prior stage (not shown) and stored in a memory of the sensor Ci, e.g. the memory 103. The step E544 is then a step of reading the memory 103.

The selected slot IT may for example be the slot ITk of rank $\underline{k}$ beginning at the instant $T_{k-1}$ and terminating at the instant Tk.

During a step E56, performed between the instant TA and the instant $T_{k-1}$, the monitor module SUR of the sensor Ci monitors the communications channel Z in order to detect any transmission activity on the channel by a neighboring node. More precisely, the monitoring module SUR monitors whether a signal is received by the receive module REC of the sensor Ci.

If no activity is detected during the monitoring step E56, then the transmit module EMI acts during a step E58 to retransmit the data MD2 that was received during the first time window in the packet PA2. More precisely, between the instants $T_{k-1}$ and Tn, the transmit module EMI transmits a contention signal to reserve access to the medium, and then during the instant Tn to TB, the transmit module EMI transmits a preamble followed by the data MD2.

If broadcast activity is detected during the monitoring step E56, then during a step E60 the sensor interprets this activity as the data MD2 being broadcast by a neighboring node that has received the same message, and it does not broadcast the data MD2.

Figure 9:
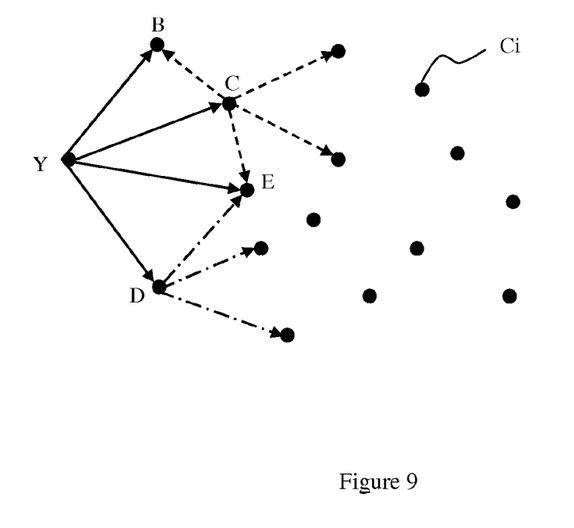
FIG. 9 is a diagram showing an implementation of the routing method performed by a plurality of sensors.

FIG. 9 shows an implementation of the routing method performed by a plurality of sensors.

During the first time window F1, a sensor Y broadcasts a data packet P containing data M.

During the first time window F1, the packet P is received by sensors B, C, D, and E all neighboring the sensor Y.

The first time window F1 comprises a contention window followed by a data transmission window. By way of example, the contention window is subdivided into four time slots IT1, IT2, IT3, and IT4.

The number 4 is selected arbitrarily to simplify the explanation. In practice, this number is greater, e.g. 16 or 32 as a function of the density of the network in terms of the mean number of neighbors for each node.

Since the transfer time differences between the source node and the various neighboring nodes is negligible, the end of the data packet P is received simultaneously by the sensors. This end corresponds to the end TA of the first time window F1 and constitutes a synchronization event that enables each sensor to determine the beginning of a second time window F2. The synchronization event is used to determine a succession of time windows that are common to all of the neighbors that have received the data packet PA.

During the second time window F2, consecutive with the first time window F1, each of the sensors B, C, D, and E selects a time slot IT from among the four slots of the contention window of the second time window F2. For example, the sensor B selects the second slot IT2, the sensor C selects the first slot IT1, the sensor D selects the fourth slot IT4, and the sensor E selects the third slot IT3.

It is specified that each sensor selects a slot without taking account of the selections made by the neighboring sensors. It is thus possible for two neighboring sensors to select the same slot.

The sensor C begins to transmit a signal starting from the beginning of the first slot IT1. The sensor B close to the sensor C detects the signal transmitted by the sensor C and does not broadcast the data M. The sensor E, also close to the sensor C, also detects the signal transmitted by the sensor C and does not broadcast the data M.

The sensor D is not close to the sensor C. During the monitoring step between the end of the first time window F1 and the beginning of the third time slot IT3 of the second window F2, the sensor D does not detect any signal. Thus, the sensor D broadcasts a data packet containing the data M.

Although the present disclosure has been described with reference to one or more examples, workers skilled in the art will recognize that changes may be made in form and detail without departing from the scope of the disclosure and/or the appended claims.

The invention claimed is:

1. A method of routing data of a message broadcast by a first device and received by at least a second device during a first time window, the first and second devices forming respective nodes of a network of a plurality of nodes suitable for communicating over a wireless communications channel, the method comprising the following steps performed by the second device:
   selecting one time slot from a set of predefined time slots of a second time window consecutive with said first time window, wherein:
      the time slot is selected by randomly drawing a value identifying said slot, the random draw being performed in application of a defined probability distribution;
      the second time window comprises a predetermined number N of predetermined consecutive time slots, a rank is associated with a slot as a function of the position of said slot relative to the beginning of the second time window, and the probability of selecting the slot of rank k+1 from among the N slots is greater than or equal to the probability of selecting the slot of rank k; and
      the probability of selecting a value identifying a slot is determined as a function of a value representative of received signal quality during reception of said data, the number of slots, and said value identifying the slot, wherein said value representative of received signal quality defines the rate of growth of the probability distribution;
   determining whether the received message is being broadcast by another second device by monitoring said channel between the end of said first time window and said selected time slot in order to detect the presence or the absence of a signal on said channel, the presence of a signal being indicative of the broadcasting of the message by the other second device;

broadcasting said data from an instant of said selected time slot in the event of detecting the absence of a signal; and not broadcasting in the event of detecting the presence of a signal.

2. A routing method according to claim 1, wherein said value representative of signal quality is determined on the basis of a measurement of said signal.

3. A routing method according to claim 1, wherein the broadcasting step is followed by an idle step during which the receive function is deactivated.

4. A routing method according to claim 1, wherein the non-broadcasting step includes a listening step during which the receive function is activated.

5. A routing method according to claim 1, wherein the non-broadcasting step is followed by a step of selecting the slot of smallest rank and a step of broadcasting data.

6. A routing method according to claim 1, wherein in the event of detecting a signal during the monitoring step, the method includes a reception step of receiving data and a comparison step of comparing the data received during the first time window with the data received during the reception step.

7. A routing method according to claim 1, wherein the broadcasting step is followed by:
   a reception step of receiving data;
   a comparison step of comparing said received data with the data transmitted during the broadcasting step, and as a function of the result of the comparison;
   an idle step during which the receive function is deactivated; or
   a step of rebroadcasting said transmitted data.

8. A device forming a node of a network having a plurality of nodes suitable for communicating via a wireless communications channel, the device comprising:
   a non-transitory computer-readable medium storing instructions; and
   a processor configured by the instructions to perform acts of:
   receiving data of a message during a first time window, said message being broadcast by a first node-forming device;
   selecting a time slot from a set of predefined time slots of a second time window consecutive with said first time window, wherein:
      the time slot is selected by randomly drawing a value identifying said slot, the random draw being performed in application of a defined probability distribution;
      the second time window comprises a predetermined number N of predetermined consecutive time slots, a rank is associated with a slot as a function of the position of said slot relative to the beginning of the second time window, and the probability of selecting the slot of rank k+1 from among the N slots is greater than or equal to the probability of selecting the slot of rank k; and
      the probability of selecting a value identifying a slot is determined as a function of a value representative of received signal quality during reception of said data, the number of slots, and said value identifying the slot, wherein said value representative of received signal quality defines the rate of growth of the probability distribution;
   determining if the received message is being broadcast by another, second device by monitoring said channel between the end of said first time window and said selected time slot in order to detect the presence or the absence of a signal on said channel, the presence of a signal being indicative of the broadcasting of the message by the other, second device;
   broadcasting said message; and
   controlling the act of broadcasting to broadcast the message from an instant of said time slot in the event of detecting the absence of a signal on said channel, and controlling the act of broadcasting to not broadcast the message in the event of detecting the presence of a signal on said channel.

9. A system comprising:
   a plurality of devices forming nodes of a network and configured to communicate via a wireless communications channel, wherein at least one of said devices comprises:
   a non-transitory computer-readable medium storing instructions; and
   a processor configured by the instructions to perform acts of:
   receiving data of a message during a first time window, said message being broadcast by a first of the plurality of node-forming devices;
   selecting a time slot from a set of predefined time slots of a second time window consecutive with said first time window, wherein:
      the time slot is selected by randomly drawing a value identifying said slot, the random draw being performed in application of a defined probability distribution;
      the second time window comprises a predetermined number N of predetermined consecutive time slots, a rank is associated with a slot as a function of the position of said slot relative to the beginning of the second time window, and the probability of selecting the slot of rank k+1 from among the N slots is greater than or equal to the probability of selecting the slot of rank k; and
      the probability of selecting a value identifying a slot is determined as a function of a value representative of received signal quality during reception of said data, the number of slots, and said value identifying the slot, wherein said value representative of received signal quality defines the rate of growth of the probability distribution;
   determining if the received message is being broadcast by another of the plurality of devices by monitoring said channel between the end of said first time window and said selected time slot in order to detect the presence or the absence of a signal on said channel, the presence of a signal being indicative of the broadcasting of the message by the other device;
   broadcasting said message from an instant of said time slot in the event of detecting the absence of a signal; and
   controlling the act of broadcasting to broadcast the message from an instant of said time slot in the event of detecting the absence of a signal on said channel, and controlling the act of broadcasting to not broadcast the message in the event of detecting the presence of a signal on said channel.

* * * * *